US010544970B2

(12) United States Patent
Nalini et al.

(10) Patent No.: US 10,544,970 B2
(45) Date of Patent: Jan. 28, 2020

(54) CONTROL DEVICE FOR REFRIGERATION AND CONDITIONING SYSTEMS

(71) Applicant: CAREL INDUSTRIES S.P.A., Brugine (IT)

(72) Inventors: Luigi Nalini, Padua (IT); Giancarlo Tasinato, Rubano (IT); Stefano Tobio, Santa Maria di Sala (IT)

(73) Assignee: CAREL INDUSTRIES S.P.A., Brugine (IT)

( * ) Notice: Subject to any disclaimer, the term of this patent is extended or adjusted under 35 U.S.C. 154(b) by 240 days.

(21) Appl. No.: 14/881,277

(22) Filed: Oct. 13, 2015

(65) Prior Publication Data
US 2016/0102897 A1   Apr. 14, 2016

(30) Foreign Application Priority Data
Oct. 14, 2014   (IT) .............................. PD2014A0267

(51) Int. Cl.
| F25D 29/00 | (2006.01) |
| F25B 41/06 | (2006.01) |
| F25B 49/02 | (2006.01) |
| B23P 15/26 | (2006.01) |

(52) U.S. Cl.
CPC ............ *F25B 41/062* (2013.01); *B23P 15/26* (2013.01); *F25B 49/02* (2013.01); *F25D 29/005* (2013.01); *F25B 2341/065* (2013.01); *F25B 2341/068* (2013.01); *F25B 2400/077* (2013.01); *F25B 2600/2513* (2013.01); *F25B 2700/2117* (2013.01); *Y02B 30/72* (2013.01)

(58) Field of Classification Search
CPC ....................... F25D 29/005; F25B 2600/2513
See application file for complete search history.

(56) References Cited

U.S. PATENT DOCUMENTS

| 5,399,805 | A  | * | 3/1995 | Tyler ..................... H01L 23/057 |
| | | | | 174/50.56 |
| 6,418,359 | B1 | * | 7/2002 | Wolf .................. G05D 23/1902 |
| | | | | 236/1 B |
| 7,476,702 | B2 | * | 1/2009 | Sagal ....................... C08K 3/22 |
| | | | | 257/789 |
| 7,897,881 | B2 | * | 3/2011 | Kaspar ................ H01L 23/3192 |
| | | | | 174/382 |
| 7,942,013 | B2 | * | 5/2011 | Kim ........................ F25D 23/02 |
| | | | | 62/125 |
| 2003/0173707 | A1 | | 9/2003 | Becker et al. |
| 2005/0075689 | A1 | * | 4/2005 | Toy .................... A61N 1/37235 |
| | | | | 607/60 |
| 2007/0178758 | A1 | * | 8/2007 | Klein .................... F25D 23/065 |
| | | | | 439/577 |

(Continued)

FOREIGN PATENT DOCUMENTS

| EP | 1017259 A2 * | 7/2000 | .............. H01H 9/18 |
| JP | 2011-133197 A | 7/2011 | |
| WO | WO 03/076856 A2 | 9/2003 | |

*Primary Examiner* — Nelson J Nieves
(74) *Attorney, Agent, or Firm* — Scully, Scott, Murphy & Presser, P.C.

(57) ABSTRACT

The disclosure provides a control device which can be installed within a cold room, and within a refrigerated or air-conditioned environment in general, without the electronics for managing the various components becoming damaged. The disclosed device is easy to install and/or retrofit and requires no burdensome wiring, ducts, cables and connections.

9 Claims, 3 Drawing Sheets

(56) References Cited

U.S. PATENT DOCUMENTS

| | | | |
|---|---|---|---|
| 2011/0019097 A1* | 1/2011 | Hsu | H04N 17/004 |
| | | | 348/608 |
| 2011/0062245 A1* | 3/2011 | Gessi | G05D 23/1393 |
| | | | 236/12.11 |
| 2012/0260679 A1* | 10/2012 | Huerta-Ochoa | F25B 41/062 |
| | | | 62/56 |
| 2013/0027068 A1 | 1/2013 | Li et al. | |
| 2015/0101357 A1* | 4/2015 | Ugolini | A23G 9/224 |
| | | | 62/126 |
| 2016/0047595 A1* | 2/2016 | Williams | F25D 29/001 |
| | | | 62/62 |

\* cited by examiner

CONTROL DEVICE FOR REFRIGERATION AND CONDITIONING SYSTEMS

The present invention relates to a control device for refrigeration and conditioning systems.

An example of refrigeration and conditioning systems is represented by cold rooms.

Cold rooms are substantially insulated chambers used for the temporary storage of perishable or frozen foods, plants, flowers and the like, both at the commercial level, where they are used for example in small sales points, and also at the distribution or industrial production level.

Refrigeration is necessary because it slows the proliferation of bacteria in foods; the extremely rapid and intense action of the cold makes it possible to preserve the organoleptic properties of the food intact, thus extending the conservation time.

A refrigeration system usually comprises a control system adapted to drive, for example, an electronic expansion valve associated with an evaporator, in order to provide the ideal heat exchange in order to maintain a preset temperature.

FIG. 1 shows schematically, by way of example, a conventional cold room A, inside which are an evaporator B with corresponding electronic expansion valve C, a pressure sensor D and a temperature sensor E.

Currently, in order to install an electronic expansion valve, all the devices in FIG. 1 are required, along with the corresponding electric wiring.

The sensors and the expansion valve are interconnected with a set of electrical and electronic devices for controlling the refrigeration system of the room.

All the elements of the set of electrical and electronic control devices E must be installed outside the room A, since they are not adapted to the environment inside, which is characterized by low temperature and high humidity.

In order to connect control devices and sensors, expensive wiring operations are necessary, with laying of pipes, wires, electrical cables and other similar components, which determine a cost both in terms of components and in terms of labor for the laying.

The aim of the present invention is to provide a control device for refrigeration and conditioning systems which is capable of overcoming the above mentioned drawbacks of the known art.

In particular, within this aim, an object of the invention is to provide a control device that can be installed inside a cold room without the electronics for managing the various components becoming damaged.

Another object of the invention is to provide a control device that is easier to install with respect to similar, conventional control devices, and which has performance levels that are at least as high.

Another object of the invention is to provide a control device for which installation does not require burdensome wiring.

This aim and these and other objects which will become better evident hereinafter are achieved by a control device for refrigeration and conditioning systems, which is characterized in that it comprises:
  an electronic expansion valve, associated with an evaporator arranged within a refrigerated/conditioned environment,
  a temperature sensor for said evaporator,
  an electronic board for the wired management of said electronic expansion valve and said temperature sensor, said electronic board being covered with a hermetic shell and being preset to be arranged within a refrigerated/conditioned environment in which said control device is installed.

Further characteristics and advantages of the invention will become better apparent from the description of a preferred, but not exclusive, embodiment of the control device according to the invention, which is illustrated by way of non-limiting example in the accompanying drawings wherein.

Figure 1:
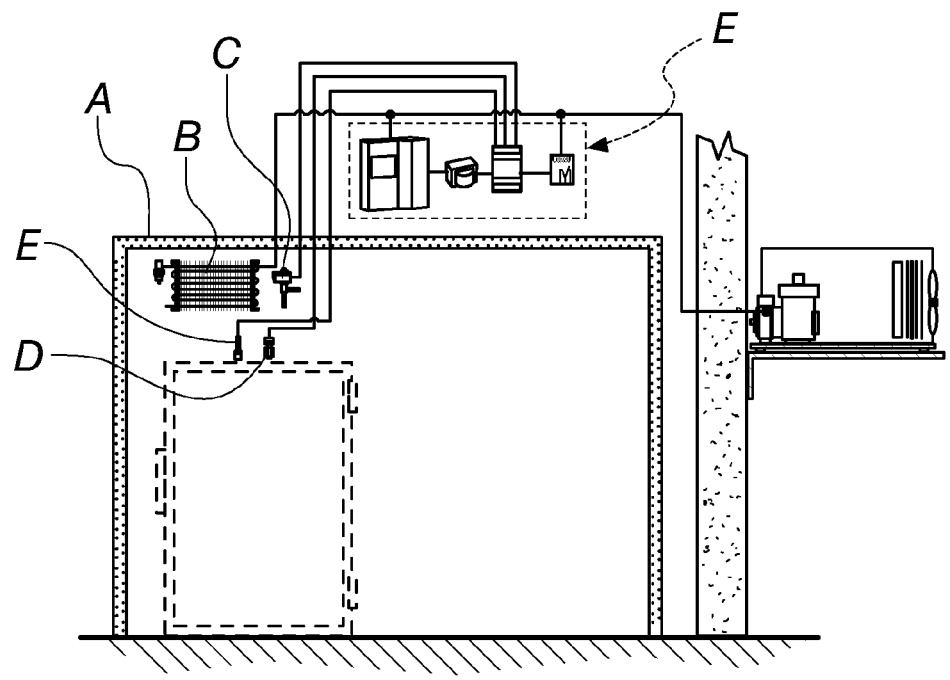
FIG. 1 is a schematic view of an example of a conventional control system for refrigerated/conditioned environments.
Figure 2:
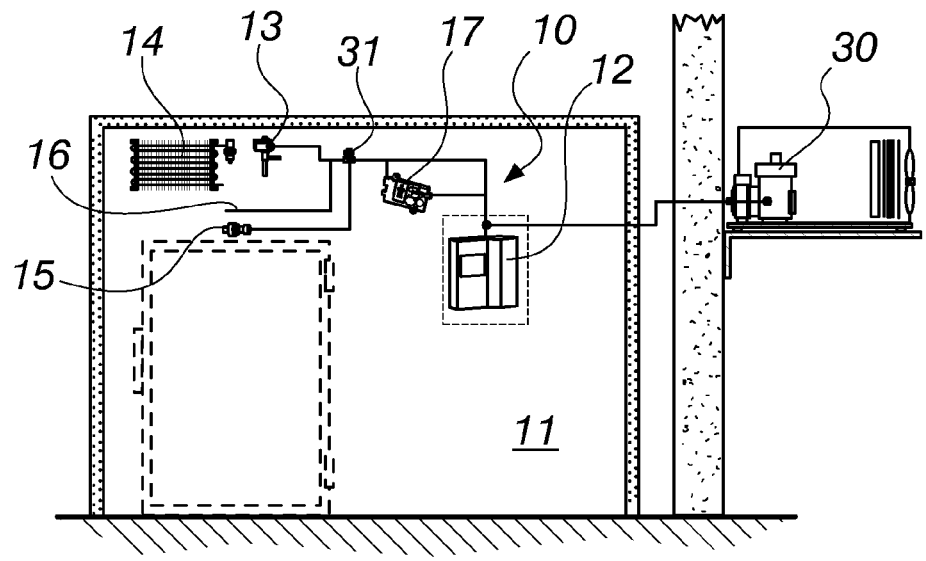
FIG. 2 is a schematic view of an example of a control device according to the invention.
Figure 3:
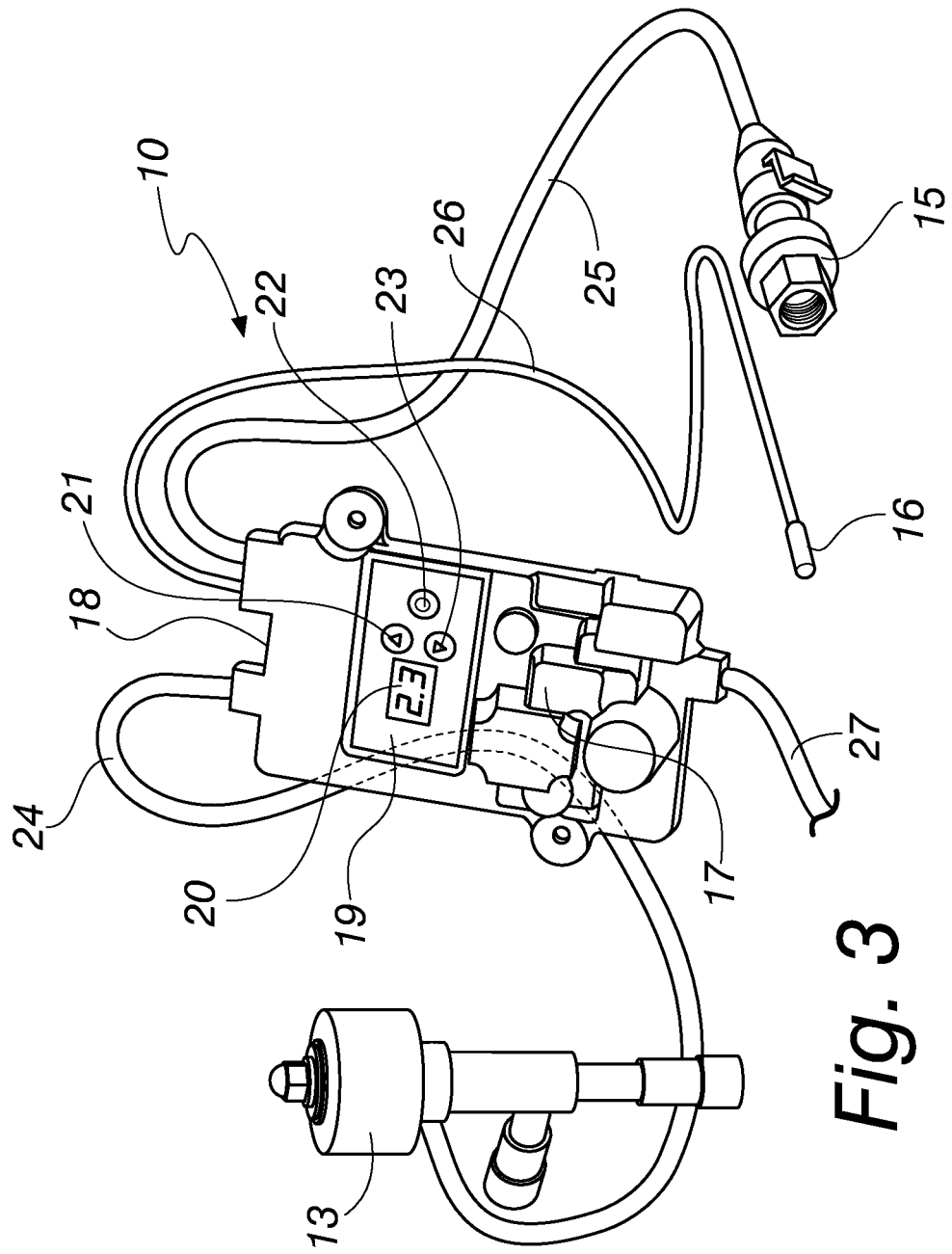
FIG. 3 is a perspective view of the control device according to the invention.
Figure 4:
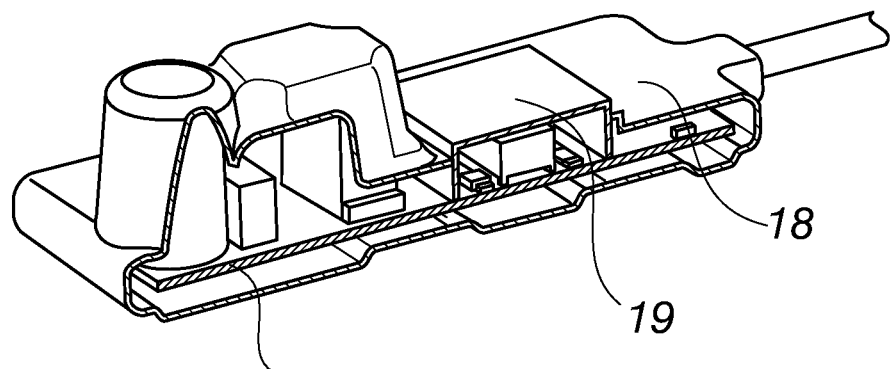
FIG. 4 is a cutaway perspective view of a component of the control device according to the invention.
Figure 5:
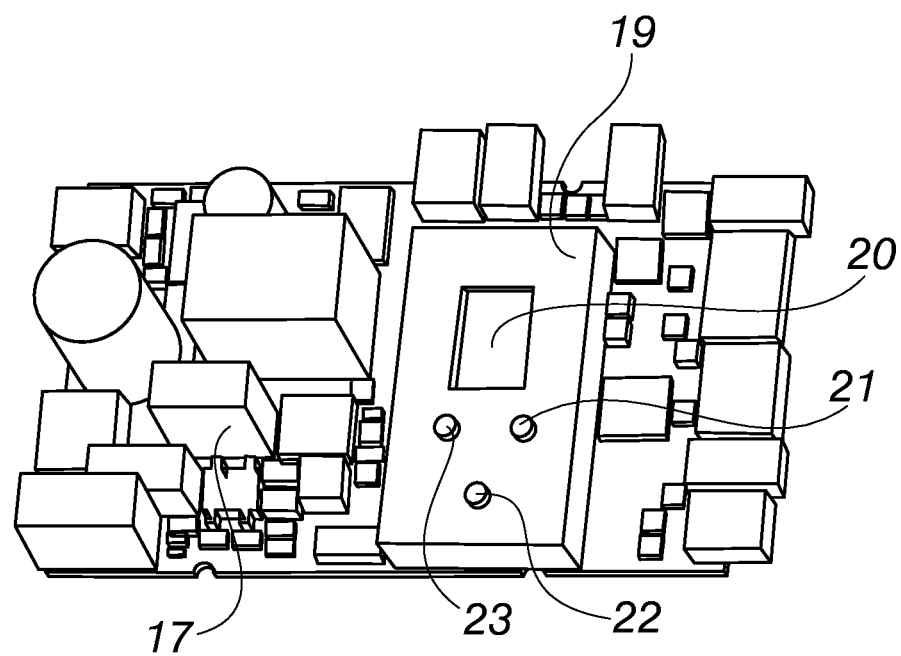
FIG. 5 is a perspective view of a detail of the control device according to the invention.

With reference to the figures, a control device for refrigeration and conditioning systems according to the invention is generally designated with the reference numeral 10, while a generic refrigerated/conditioned environment, such as for example a cold room, is designated with the reference numeral 11.

The control device 10 is characterized in that it comprises:
  a control panel 12, outside the cold room 11,
  an electronic expansion valve 13, associated with a evaporator 14 arranged within the cold room 11,
  a pressure sensor 15 for the evaporator 14,
  a temperature sensor 16 for the evaporator 14,
  an electronic board 17, for the wired management of the electronic expansion valve 13, the pressure sensor 15, and the temperature sensor 16.

The electronic board 17 is covered with a hermetic shell 18, made of plastic material, and is preset to be arranged within a refrigerated/conditioned environment 11 in which the control device 10 is installed.

The plastic material that defines the hermetic shell 18 is constituted of a polyamide-based resin with adhesive characteristics, which is adapted to be injection molded at low pressure.

The hermetic shell 18 is adapted to isolate the electronic management board 17, enclosed therein, from the environmental conditions typical of the inside of a refrigerated/conditioned environment, conditions which are usually adverse to the efficient operation of electronics; the plastic material used for the hermetic shell 18 is capable of maintaining its performance in a temperature interval between −40° C. and +80° C.

In a variation of embodiment of the control device 10 according to the invention, not shown for the sake of simplicity, the control panel 12 is not present, and in its place there is a simpler electromechanical thermostat, of conventional type.

In a further variation of embodiment of the invention, in place of the pressure sensor 15 there is a second temperature sensor.

In general such combination of sensors described herein should be understood to be illustrative and non-limiting of the invention, in that the control device 10 can be wired with a plurality of sensors and other elements according to necessity and requirements.

On the electronic management board 17 there is a protective frame 19 which is contoured to surround a display 20 and three buttons 21, 22, 23 which are mounted on the electronic board 17; the protective frame 19 is embedded in the hermetic shell 18.

In a variation of embodiment of the control device 10 according to the invention, the electronic board 17 is entirely coated and covered by the hermetic shell 18 with no protective frame for some electronic components.

The control device 10 also comprises electrical cables 24, 25, 26 for connecting the electronic board 17 with the electronic expansion valve 13, the pressure sensor 15 and the temperature sensor 16, and with an electric power supply cable 27.

The wiring contacts of the cables 24, 25, 26, 27 are also surrounded and enclosed hermetically in the hermetic shell 18.

The invention also relates to a method for providing an electronic board 17 for managing an electronic expansion valve 13, a pressure sensor 15 and a temperature sensor 16 for a control device 10 as described above.

Such method consists in:
electrically wiring the electronic management board 17 with electric cables 24, 25, 26 for connection to the electronic expansion valve 13, the pressure sensor 15 and the temperature sensor 16, and with an electric power supply cable 27,
arranging the protective frame 19 on the electronic board 17,
overmolding the hermetic shell 18 on the electronic board 17 by way of an operation of low-pressure molding of a polyamide-based resin with adhesive characteristics.

The overmolding process occurs at the injection temperatures of the material, so that the electronic board 17 is not damaged in the operation.

Obviously in the event of the absence of the pressure sensor 15 and of the protective frame 19, the corresponding operations of wiring and positioning on the card are not performed.

Thanks to the hermetic shell 18 for electrical and thermal insulation, and thanks to the pre-wiring of the electronic board 17 before the molding operation, a control device 10 is provided in which the electronics for managing the expansion valve 13 and the sensors 15 and 16 can easily be installed within a refrigerated/conditioned environment 11 together with the expansion valve 13 and with the pressure sensor 15 and temperature sensor 16.

The only connections that need to be provided between the inside and the outside of the cold room 11 are those with the control panel 12 and with a compressor 30 of the refrigeration system of which the evaporator 14 is part.

In practice it has been found that the invention fully achieves the intended aim and objects.

In particular, with the invention a control device has been provided which can be installed within a cold room, and within a refrigerated/conditioned environment in general, without the electronics for managing the various components becoming damaged.

At the same time, with the invention a control device has been provided that is easier to install with respect to similar, conventional control devices, and which has performance levels that are at least as high.

With the invention in fact a control device has been provided, for the installation of which no burdensome wiring is needed with laying of ducts, cables and connections, typical of conventional control systems.

Moreover, with the invention a control device has been provided which is an important retrofit for refrigeration/conditioning systems that are provided with mechanical thermostatic valve, since the same control device 10 makes it possible to easily substitute such mechanical thermostatic valve, with reduced costs and without additional wiring.

The invention, thus conceived, is susceptible of numerous modifications and variations, all of which are within the scope of the appended claims. Moreover, all the details may be substituted by other, technically equivalent elements.

In practice the components and the materials employed, provided they are compatible with the specific use, and the contingent dimensions and shapes, may be any according to requirements and to the state of the art.

The disclosures in Italian Patent Application No. PD2014A000267 (102014902300902) from which this application claims priority are incorporated herein by reference.

What is claimed is:

1. A control device for a refrigeration system installed within a refrigerated environment, comprising:
an electronic expansion valve, associated with an evaporator arranged within a said refrigerated environment,
a temperature sensor for said evaporator,
an electronic board for a wired management of said electronic expansion valve and said temperature sensor, said electronic board being covered with a hermetic shell and arranged within a said refrigerated environment in which said control device is installed, wherein on said electronic board there is a protective frame that is contoured to surround a display and a plurality of buttons which are mounted on said electronic board, said protective frame being embedded in said hermetic shell, wherein said protective frame comprises an upper surface opposed to said electronic board, and wherein said upper surface is at least as far from said electronic board as an external surface of said hermetic shell around said protective frame is.

2. The device according to claim 1, wherein said hermetic shell is made of plastic material constituted by polyamide-based resin with an adhesive characteristics which is adapted to be injection molded at low pressure.

3. The device according to claim 1, wherein the control device comprises a pressure sensor for said evaporator.

4. The device according to claim 2, wherein said plastic material used for the hermetic shell is capable of maintaining a plastic materials hermetic performance in a temperature interval between −40° C. and +80° C.

5. The device according to claim 3, comprising electrical cables for connecting the electronic board with said electronic expansion valve, said pressure sensor and said temperature sensor, and with an electric power supply cable.

6. The control device according to claim 5, wherein wiring contacts of said electrical cables are surrounded and enclosed hermetically in the hermetic shell.

7. A method for providing an electronic board for management of an electronic expansion valve and of a temperature sensor for a control device according to claim 1, comprising the steps of
electrically wiring said electronic board with electric cables for connection to said electronic expansion valve and said temperature sensor, and with an electric power supply cable,
overmolding said hermetic shell on said electronic board by way of an operation of low-pressure molding of a polyamide-based resin with adhesive characteristics.

8. The device according to claim 1, wherein said hermetic shell does not extend over any portion of said upper surface of said protective frame.

9. The device according to claim 1, wherein said plurality of buttons are not covered by said hermetic shell.

\* \* \* \* \*